3,058,907
Patented Oct. 16, 1962

3,058,907
REFORMING LIGHT HYDROCARBONS WITH A PLATINUM ALUMINA CATALYST

Robert A. Van Nordstrand, Flossmoor, and John W. Teter, Chicago, Ill., Carl D. Keith, Munster, Ind., and Anna P. Hauel, West Orange, N.J., assignors to Engelhard Industries, Inc., a corporation of New Jersey
No Drawing. Original application Sept. 20, 1955, Ser. No. 535,516, now Patent No. 2,938,211, dated May 24, 1960. Divided and this application Mar. 3, 1960, Ser. No. 16,114
6 Claims. (Cl. 208—138)

This invention relates to a novel alumina trihydrate composition, having particular value as a precursor hydrous alumina composition in the production of calcined alumina base catalysts. In a special aspect, it relates to utilization of the novel alumina trihydrate composition as precursor base for a reforming type catalyst essentially comprising calcined alumina and a platinum metal having hydrocarbon conversion activity. The invention is based upon discovery of a novel crystalline alumina trihydrate form as determined by X-ray diffraction analysis, and the special properties of alumina trihydrate compositions containing the new trihydrate form in substantial proportion as precursor bases for calcined alumina base catalysts.

In the hydrocarbon conversion field, platinum-alumina catalysts have become commercially important in catalytic reforming operations designed to convert virgin naphthas of low octane to high octane gasoline stocks and to produce aromatics from selected gasoline fractions. A number of factors are significant in development of platinum-alumina catalysts of activity and selectivity suitable for commercial utilization. Because of the high cost of platinum-containing catalysts, long catalyst life, measured by a low rate of activity decline, is even more important than high initial or virgin activity. A critical factor in determining catalyst life as well as activity and selectivity is the nature of the alumina base. It has been found, as described in application Serial No. 288,058, filed May 15, 1952, now abandoned, by John W. Teter, John L. Gring, and Carl D. Keith, and its continuation-in-part application, Serial No. 489,726, filed February 21, 1955, now U.S. Patent No. 2,838,444, that a catalyst having a calcined alumina base produced from a mixture of precursor hydrous alumina phases containing from about 65 to about 95 weight percent alumina trihydrate possesses a number of significant advantages in use as a reforming catalyst or a catalyst for production of aromatics. The finished catalyst contains gamma alumina modifications and has a base structure characterized by large pore volume, e.g., greater than about 0.1 cc. per gram of its pore volume in pores of more than 100 Angstrom units in size, high surface area, e.g. about 350 to about 550 square meters per gram, when the precursor alumina hydrate composition is dried and calcined; and it contains about 0.1 to about 1.5% by weight of a platinum metal component present in sufficiently finely distributed form as to exhibit by X-ray diffraction analysis the substantial absence of crystallites greater in size than about 50 Angstrom units. Greater amounts of platinum whether detectable or undetectable by X-ray analysis show no advantage justifying the expense. The calcined catalyst contains generally upwards of about 2% by weight of matter volatile at 1100° C. and if calcined at 900° F. with dry air and cooled with dry air, such volatile matter constitutes from about 2 to about 5% of the weight of the catalyst. The catalysts have high activity including unusually high dehydrocyclization activity, low rates of activity decline and can be regenerated by oxidative means.

As described in the above applications the alumina precursor composition is produced from an alumina hydrogel which may be formed by precipitating gelatinous hydrous alumina from a solution of a soluble aluminum salt such as aluminum chloride by means of ammonium hydroxide. Aqueous ammonium hydroxide can be added to the aluminum chloride solution until a pH of about 8 has been reached while stirring the mixture vigorously. Following the precipitation, the precipitate is separated and washed with water in order to reduce the concentration of contaminating ions, e.g. chloride ion in the case of ammonium chloride, to a low limit usually less than about 0.2%. The washed precipitate then is converted, usually by aging as long as necessary, or by seeding, from the predominantly amorphous state as freshly precipitated to a mixture predominating in crystalline trihydrate forms of alumina. The trihydrate phase contains forms as determined by X-ray diffraction analysis of dried samples corresponding to gibbsite and bayerite and also to a new previously unknown form of alumina trihydrate which appears to be intermediate gibbsite and bayerite in crystalline structure, which gives a line of 4.79 A. by X-ray diffraction (Cu radiation) and which has been termed randomite. The precursor base also contains about 5 to about 35 weight percent of other hydrous aluminas in the form of alumina monohydrate, e.g. boehmite, as detected by X-ray analysis after drying or in the form of amorphous hydrous alumina or mixtures of these forms.

The precious metal component, rhodium, palladium, iridium, or most advantageously platinum, may be incorporated through mixing the alumina component with the desired amount of precious metal component in the form of a soluble or colloidally dispersible compound. For example, chlor-platinic acid may be added to the slurry and precipitated by introduction of hydrogen sulfide in aqueous solution. Alternatively, the platinum may be introduced in the form of a sulfide sol. The platinum-containing composition is dried as by spray, oven or drum drying. The dried composition then may be formed into tablets or pills or may be rewetted and extruded to particles of desired size. The resulting catalyst particles can be calcined by heating to about 800° to about 1100° F. or more for a period of about 3 to about 12 hours in an atmosphere of a flowing oxygen-containing gas. Before use, the catalyst can be reduced by subjecting it to flowing hydrogen at about 800° to about 1100° F. for a period up to several hours.

The crystalline nature of the trihydrate precursor base composition is important from a number of aspects. When the platinum metal is incorporated in the base structure, it appears to enter into combination with, or actually dissolve or disappear into the alumina structure. For after calcination in the presence of air, X-ray diffraction analysis indicates the substantial absence of platinum crystallites of size greater than 50 Angstrom units.

The crystalline character of the trihydrate precursor base also results in a characteristic large pore, high area structure for the calcined alumina catalyst. The catalyst will generally have about 0.1 to about 0.5 cc. per gram preferably about 0.15 to about 0.3 cc. per gram of its total pore volume as determined by BET nitrogen adsorption analysis in pores greater than about 100 Angstrom units in size. The complete adsorption isotherm indicates a number of fine pores in the less than 20 Angstrom range, a substantial volume in pores in the 20 to 100 Angstrom range and with the bulk of the remaining pores distributed over the 100 to 1,000 Angstrom range. Catalysts made from amorphous or monohydrate type alumina precursor base compositions ordinarily have substantially no pores less than 20 Angstroms in size but have the bulk of the pore volume in the 20 to 40 Angstrom units size range. Most of the remaining pores are ordinarily less than 100 Angstrom units in size.

Our invention is based in part on the discovery that when a mixture of alumina trihydrate phases is formed by conversion of freshly precipitated amorphous hydrous alumina, the previously unknown form of alumina trihydrate, randomite, is produced. Our invention is further based on the discovery that when the proportion of alumina trihydrate in the form of randomite is maximized so that its predominates in the trihydrate mixture, a superior precursor base composition is afforded for the production of a large pore, high area platinum-alumina catalyst which catalyst is of the type of the said Teter et al. applications. The randomite form may be identified by X-ray diffraction analysis. When a sample of the alumina trihydrate composition is dried at about 110° C. and subjected to analysis with a 90° Norelco X-ray diffraction machine, a line may be observed at 4.79 Angstrom units. The known bayerite form gives a line at 4.73 Angstrom units. The gibbsite form gives a line at 4.85 Angstrom units. All three forms are crystalline in character, with crystallites of about 300 to 1000 Angstrom units in size although the bayerite crystallites may range somewhat larger. The remaining hydrous alumina is of amorphous hydrous alumina form or a monohydrate (AlO.OH) corresponding after drying to boehmite which is of very small crystallite size and which gives broad X-ray diffraction lines. When the randomite form is calcined at high temperature it is converted partially to the eta form of gamma alumina and gives a weak X-ray line at 4.5 Angstrom units or 19.5 degrees on a spectrometer with copper radiation.

A high randomite precursor platinum-alumina catalyst can be made by precipitating hydrous alumina from aluminum chloride with ammonia while maintaining the mixture on the alkaline side, e.g. about pH 9, and by holding the precipitate in the mother liquor for several hours, say about 8 to 48 hours. Apparently, seeding in the mother liquor is initiated which is favorable to formation of randomite at the expense of either or both of the gibbsite and bayerite forms. The hydrate composition, after the period of holding in the mother liquor, is washed with distilled or deionized water to substantially free the composition of chloride ion. The hydrate composition is aged sufficiently to reach the desired trihydrate content, e.g. 85 weight percent. The aged hydrate composition then may be treated with a source of platinum in order to incorporate the platinum in finely dispersed condition in the mass, as by precipitating platinum sulfide in situ from chloroplatinic acid with aquous hydrogen sulfide or as by treating the hydrate composition with a colloidal platinum sulfide sol. The resulting composition is dried and calcined.

A precipitated and filtered alumina hydrogel prepared by adding ammonium hydroxide to aluminum chloride as the source of aluminum ion can be prepared by controlled washing at elevated temeperature. The formation of randomite is maximized at temperatures above 110° F., usually at about 130 to about 140° F. At higher temperatures, formation of randomite is favored, but the rate of transformation to trihydrates falls off rapidly. The pH during the washing step is maintained at about 7 to about 9 to obtain a reasonably rapid rate of conversion to amorphous alumina to the desired trihydrate composition.

We have found that when a high randomite alumina trihydrate composition is used in the preparation of a platinum alumina catalyst, the resulting catalyst has particularly high activity combined with surprisingly extended catalyst life. The proportion of trihydrates in the precursor composition should approximate 65 to 95 weight percent. The proportion of randomite in the trihydrate mixture should exceed 50 weight percent of the trihydrates.

In an example of a trihydrate precursor base illustrating our invention and its utilization in the form of a platinum alumina reforming process, three volumes of an aluminum chloride solution (containing 0.63 mole of aluminum per liter) were reacted with one volume of ammonium hydroxide (about 10 liters of approximately 28% ammonium hydroxide solution diluted with 8 liters of water) by mixing these solutions continuously in a pipe while maintaining the pH constant at 9 and the concetration of the resulting slurry during precipitation approximately constant. The temperature of the aluminum chloride was 23° C. and the temperature of the ammonium hydroxide was 13° C. The temperature of the finished slurry was 28° C. before filtration. The precipitate was held in the mother liquor for 20 hours. The resulting material was filtered on a rotary filter to recover the precipitated alumina hydrogel. The filter cake was washed by reslurrying in de-ionized water and refiltering until the residual chloride content was reduced to 0.13%. The temperature of the wash water was 21° C. After the washed precipitate had aged for a total of 19 days, it had a total trihydrate content (basis of 100 weight percent of crystals) of about 89 weight percent of which about 64% was randomite and about 25% was bayerite. There was no detectable content of gibbsite and the balance was the monohydrate type of alumina.

Chlorplatinic acid solution in an amount providing 0.6% platinum in the finished catalyst was added and precipitated by introduction of aqueous hydrogen sulfide solution. The mass was dried on a drum drier at 110° C. 883 g. of dried catalyst powder and 265 ml. of water were mixed with a Readco dough mixer for fifteen minutes. The resulting mix was then extruded on a 2" twin screw extruder, using a 1/16" die and cut into the form of small extruded particles. The resulting pellets were oven dried overnight at 110° C. Of these oven dried pellets 650 cc. were taken and dehydrated in a calcining unit, starting at room temperature, at 15.2 cu. ft. of inert gas (e.g. nitrogen) per hour. The temperature was raised to 480° C. and at that point the nitrogen flow was discontinued and air flow was started. These conditions were held for 3 hours with air flow.

The resulting catalyst, designated 400–G–9145 was evaluated by subjecting it to continuous processing for 36 hours in a bench scale metal reactor. The feed was a Mid-Continent naphtha of 247° to 357° F. boiling range, having a research octane number, neat, of 37.0. Under conditions of accelerated aging at high space velocity, 36 WHSV, 940° F. temperature, 200 p.s.i.g., and 5/1 hydrogen to hydrocarbon ratio, the high randomite catalyst showed in check runs a relative activity of 129 (and 124 check) and a relative life of 140 compared to the activity and life of another catalyst of high quality of the type described in the above applications of Teter, Gring and Keith having relative activity and life of 100 which did not contain a predominant amount of randomite. The superior quality of the high randomite type catalyst was confirmed in a prolonged aging run (565 hours) in a unit equipped for hydrogen recycle. The conditions, with the same feed as above, were 925° F., 200 p.s.i.g., 3 WHSV, and 10/1 hydrogen to hydrocarbon ratio. The octane decline during the run was only about 5 points from 99.7 research, neat, initially to 94.5. Hydrogen gas make continued high at the 1500–1700 cubic feet/barrel level, throughout the run.

The catalyst preparation can be modified to incorporate the platinum metal after the alumina base has been prepared and calcined by impregnating the precalcined base with a solution containing the appropriate platinum component and precipitating it in place. In preparation, we prefer to employ pure ingredients, particularly with respect to avoiding the presence of iron and other metals and also sodium and the alkali metals. If desired, an acidic promoter such as fluoride ion may be incorporated as a promoter although this tends to depreciate the regenerability of the catalyst.

In use, conventional reforming conditions of 850 to

1000° F. temperature, 150 to 750 p.s.i.g. pressure, 1 to 10 weight hourly space velocity and a hydrogen to hydrocarbon ratio of 1/1 to 20/1 can be employed. The catalyst is usually employed in large particle form in a series of fixed bed reactors equipped for interheating. The catalyst, however, may be used in finely divided form and handled in a fluidized system. In the reforming operation, the feed stock is preheated and with recycle hydrogen is charged to the reaction zone at the space velocity and pressure required for the desired severity. The reaction effluent is flashed to separate recycle hydrogen and the liquid product is fractioned in the customary manner.

Except for X-ray diffraction data, unless otherwise indicated when specifying percentages of components of the catalyst composition and of the alumina hydrate we refer to weight percent on an ignited basis. Also, surface areas as mentioned above are calculated on an ignited weight basis.

This application is a division of application Serial No. 535,516, filed September 20, 1955, now U.S. Patent No. 2,938,211.

We claim:
1. The process of reforming light hydrocarbon stocks to produce gasoline, benzene and other selected aromatics, which comprises contacting the hydrocarbon stock under reforming conditions of temperature, pressure and hydrogen partial pressure with a reforming catalyst essentially comprising calcined alumina and a platinum metal having reforming activity which is characterized by large pore, high area base structure essentially composed of gamma-alumina modifications resulting from the drying and calcination of a mixture of precursor hydrous alumina phases containing from about 65 to about 95% of trihydrate, the trihydrate alumina containing in a major proportion the randomite form of alumina trihydrate characterized by a line of 4.79 A. as determined by X-ray diffraction analysis, said catalyst containing from about 0.1% to about 1.5% by weight of a platinum metal, said platinum metal being present in sufficiently finely divided form as to exhibit by X-ray diffraction studies, the substantial absence of crystallites and crystals of size larger than about 50 Angstrom units.

2. The method of claim 1 in which the platinum metal is platinum.

3. The method of claim 2 wherein reforming conditions include a temperature from about 850 to 1,000° F.

4. The process of claim 3 wherein the proportion of randomite in the trihydrate mixture exceeds 50 weight percent of the trihydrates.

5. The process of claim 4 wherein the reforming conditions include pressures from about 150 to 750 p.s.i.g.

6. The process of claim 5 wherein the mixture of precursor hydrous alumina phases contains from about 5 to 35 weight percent of a hydrous alumina selected from the group of alumina monohydrate, amorphous hydrous alumina, and their mixtures.

References Cited in the file of this patent
UNITED STATES PATENTS

| | | |
|---|---|---|
| 2,499,675 | Owen | Mar. 7, 1950 |
| 2,662,860 | Engel et al. | Dec. 15, 1953 |
| 2,723,947 | Oblad et al. | Nov. 15, 1955 |
| 2,749,216 | Dinwiddie et al. | June 5, 1956 |